April 4, 1939. A. T. CASSIERE 2,152,632
FEED MECHANISM
Filed May 1, 1934
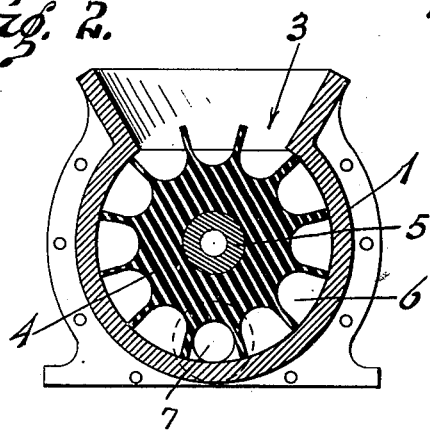
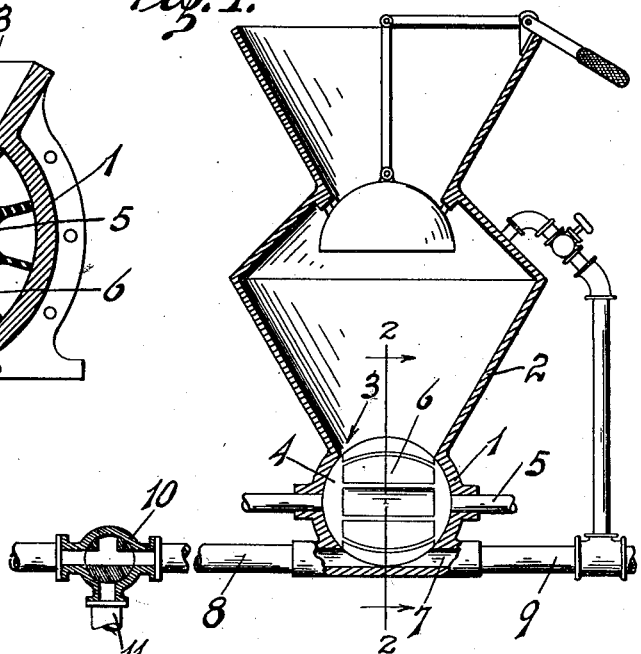
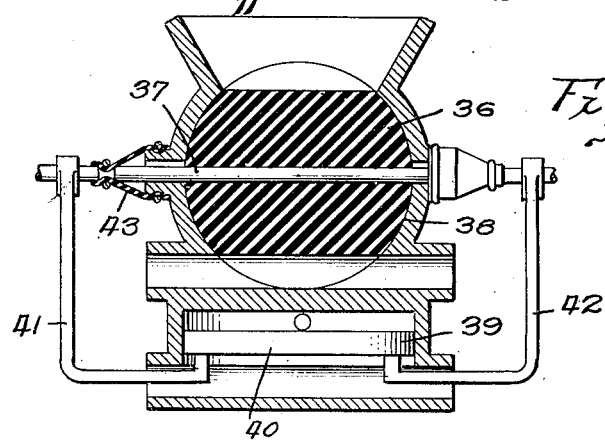
INVENTOR.
ALPHONSE T. CASSIERE.
BY
*H. A. Duckman*
ATTORNEY.

Patented Apr. 4, 1939

2,152,632

UNITED STATES PATENT OFFICE 2,152,632

FEED MECHANISM

Alphonse T. Cassiere, Long Beach, Calif., assignor to Frank L. Rogers, Long Beach, Calif.

Application May 1, 1934, Serial No. 723,351

6 Claims. (Cl. 302—49)

This invention relates to a feed mechanism whereby materials are continuously fed under pressure to a point of delivery.

My feed mechanism is particularly applicable to feeding or mixing cementitious material, altho other materials may be fed and these materials may be dry, moist, or wet.

Another object is to provide a feed wheel shaped as a figure of revolution, this feed wheel acting as a valve to prevent the escape of air from the air conduit.

Another object is to provide a feed mechanism of the character stated, in which the feed wheel is seated against the intake opening or against the discharge opening, thereby maintaining a pressure in the air conduit.

A feature of my invention is to provide a feed wheel formed of rubber or a yieldable, fibrous material which acts to convey material to the air conduit, and also as a valve to prevent the escape of air from said air conduit.

A further object of my invention is to provide a feed mechanism including a feed wheel shaped as a figure of revolution, the periphery of the feed wheel being provided with a plurality of recesses or pockets which are adapted to receive material to be fed and said material is then conveyed by the wheel to an air conduit.

A further feature of my invention is to provide a feed mechanism in which a feed wheel conveys material directly into the flow of air in the air conduit.

Other objects, advantages and features of invention may appear from the accompanying drawing, the subjoined detailed description, and the appended claims.

In the drawing

Figure 1 is a longitudinal sectional view of my feed mechanism, showing a spherical type of feed wheel.

Figure 2 is a transverse sectional view of my feed mechanism taken on line 2—2 of Figure 1.

Figure 3 is a vertical sectional view of a modified form of feed mechanism including means to exert a downward pressure on the feed wheel.

Referring more particularly to the drawing, the feed mechanism shown in Figure 1 comprises a housing 1. A hopper 2 rises from the housing 1 and has a suitable capacity for the purpose intended. An intake opening 3 is provided in the top of the housing 1 thru which the material passes, as will be later described.

A feed wheel 4 is rotatably mounted in the housing 1, and this feed wheel is formed as a figure of revolution, e. g., a sphere, a cone, an ellipsoid, etc.

A shaft 5 is journaled in the housing 1 and the feed wheel 4 is fixedly attached to this shaft. The shaft 5 extends to a suitable source of power (not shown) and is continuously rotated. A plurality of peripheral pockets 6 are formed in the feed wheel 4 and these pockets preferably extend parallel to the shaft 5. The material in the hopper 2 falls into the pocket 6 and is carried downwardly in said pocket to the discharge opening.

An air conduit 7 is provided in the housing 1, and in Figures 1 and 2, the feed wheel extends into said air conduit. That is, the pockets 6 conform to the shape of the air conduit 7 so that material in the pockets is blown out by the air in the conduit. An air supply pipe 8 extends into one end of the conduit 7 and an outlet pipe 9 extends from the other end of said conduit. The pipe 9 extends to a point of final delivery, such as a cement nozzle, if my feed mechanism is used in connection with the laying of cement under pressure. A constant air pressure is maintained in the pipe 8 and it will be evident that as each of the pockets 6 moves into the conduit 7, the material in the pockets will be blown out into the pipe 9, and thence to the point of delivery. The pressure of air in the conduit 7 will urge the feed wheel 4 upwardly towards the intake 3 and will press the periphery of the feed wheel tightly against the side walls of the housing. Thus, the feed wheel acts as a valve so that the air will not escape from the conduit 7 with the exception of the small amount that is trapped in each of the pockets 6 as they traverse the conduit. The feed wheel 4 is preferably made of rubber, altho any other yieldable or fibrous material may be used.

For the purpose of cleaning and draining my feed mechanism, I may provide a two-way valve 10 in the pipe 8. A by-pass 11 extends from the valve 10 thru which material is drained or forced from the feed mechanism and the various pipes attached thereto.

The arrangement shown in Figure 3 is substantially identical with that shown in Figures 1 and 2, with the exception that a pressure equalizer is disclosed. The feed wheel 36 is fixedly mounted on a shaft 37. The housing 38 is provided with a cylinder 39 in the bottom thereof. A piston 40 is mounted in the cylinder 39 and a pair of arms 41, 42 extend upwardly and are journaled on the shaft 37 on each side of the feed wheel 36. When air under pressure is introduced above the piston 40, the shaft 37 and the feed wheel 36 will be pulled downwardly to relieve an excessive upward pressure against the feed wheel. A flexible boot 43 is attached to the shaft 37 on each side of the housing 38 for the purpose of preventing air leakage around the shaft. One end of the boot is journaled on the shaft and the other end of the boot is clamped to the housing.

It is evident that the equalizers can be so arranged that the feed wheel will be pressed downwardly, and a valve action thus provided around the air conduit or the discharge opening, instead of at the inlet or hopper.

Having described my invention, I claim:

1. A feed mechanism comprising a housing, a feed wheel rotatably mounted in said housing, said housing having a material intake, an air conduit adjacent the feed wheel thru which air under pressure is forced, an outlet in the housing to said air conduit, said feed wheel having elongated peripheral pockets therein whereby material is conveyed from the intake to the air conduit, said feed wheel being spherical in shape, said feed wheel projecting into the air conduit, said pockets being arranged in the feed wheel parallel to the conduit.

2. A feed mechanism comprising a housing, a feed wheel in the housing, a shaft on which the feed wheel is mounted, said shaft projecting from the housing, a hopper on the housing whereby material is fed thereto, an air conduit adjacent said feed wheel, said housing having an opening extending to the air conduit, said feed wheel having peripheral pockets therein whereby material is conducted from the hopper to the air conduit, an equalizer means bearing against the shaft whereby the feed wheel is urged downwardly, said feed wheel being spherical in shape, and the pockets therein extending into the air conduit.

3. A feed mechanism comprising a housing, a spherical feed wheel rotatably mounted in said housing, a shaft on which the feed wheel is fixed, said housing having a material intake, an air conduit adjacent the feed wheel thru which air under pressure is forced, an outlet in the housing to said air conduit, said feed wheel having peripheral pockets therein whereby material is conveyed from the intake to the air conduit, said pockets projecting into the air conduit, and means engaging the shaft whereby the feed wheel is pressed against the housing around the intake whereby the leakage of air from the air conduit is prevented.

4. A feed mechanism comprising a housing, a feed wheel rotatably mounted in said housing, a shaft on which the feed wheel is fixed, said housing having a material intake, an air conduit adjacent the feed wheel thru which air under pressure is forced, an outlet in the housing to said air conduit, said feed wheel having peripheral pockets therein whereby material is conveyed from the intake to the air conduit, said feed wheel being pressed against the housing around the intake whereby the leakage of air from the air conduit is prevented, and equalizer means engaging the feed wheel shaft whereby said feed wheel is urged towards the air conduit.

5. A feed mechanism comprising a housing, a feed wheel rotatably mounted in said housing, a shaft on which the feed wheel is fixed, said housing having a material intake, an air conduit adjacent the feed wheel thru which air under pressure is forced, an outlet in the housing to said air conduit, said feed wheel having peripheral pockets therein whereby material is conveyed from the intake to the air conduit, said feed wheel being formed of yieldable material and adapted and arranged to form a valve with said housing whereby air is prevented from leaking from the air conduit, and means engaging the shaft to press the feed wheel against the housing.

6. A feed mechanism comprising a housing, a feed wheel in the housing, a shaft on which the feed wheel is mounted, said shaft projecting from the housing, a hopper on the housing whereby material is fed thereto, an air conduit below said feed wheel, said housing having an opening extending to the air conduit, said feed wheel having elongated peripheral pockets therein whereby material is conducted from the hopper to the air conduit, an equalizer means bearing against the shaft whereby the feed wheel is urged downwardly, said feed wheel being spherical in shape and the pockets therein extending into the air conduit, said pockets being arranged parallel to the air conduit.

ALPHONSE T. CASSIERE.